UNITED STATES PATENT OFFICE.

CHARLES HAZELIUS STERNBERG, OF LAWRENCE, KANSAS.

COMPOSITION FOR FUEL.

SPECIFICATION forming part of Letters Patent No. 316,580, dated April 28, 1885.

Application filed February 17, 1885. (No specimens.)

*To all whom it may concern:*

Be it known that I, CHARLES HAZELIUS STERNBERG, a citizen of the United States, residing at Lawrence, in the county of Douglas and State of Kansas, have invented a certain Improvement in Artificial Fuel; and I do hereby declare that the following is a full, clear, and exact description of the invention, which will enable others skilled in the art to which it appertains to make and use the same.

The object of my invention is to utilize as a fuel materials heretofore nearly useless for this purpose—such as slacked coal, coal-dust, ground cinders, soot, sawdust, wood-shavings, ground corncobs, wood-chips, chopped straw and hay or weeds, and dry manure, in connection and combination with rosin and asphaltum—as a fuel for use in coal or wood stoves, furnaces, ranges, or wherever fuel is used for heating purposes. This composition is made in the following manner, to wit: Ten parts of rosin and asphaltum combined are ground together with ninety parts of the following substances in combination, viz: slacked coal, or powdered coal, or ground cinders, soot, sawdust, or wood-shavings, ground corncobs, or wood chips, or chopped weeds, or dry manure. These ingredients are thoroughly pulverized and mixed. The combination is then thrown into covered iron vessels and heated until the whole mass has a sticky consistency. It is then placed in prepared molds and pressed into blocks of such size as may be desired, which are then dipped in hot rosin and stamped ready for the market.

I do not hold myself to any exact formula in the manufacture of this fuel, as the proportion may be varied to the purposes for which it may be specially intended as a fuel, although the above proportion is recommended.

Having fully described my invention, what I desire to claim, and secure by Letters Patent, is—

The artificial fuel herein described, consisting of rosin, asphaltum, slacked coal, powdered coal, or ground cinders, soot, powdered dry manure, and sawdust, wood-shavings, or ground corncobs, combined and prepared in the manner substantially as specified.

CHARLES HAZELIUS STERNBERG.

Witnesses:
 HYMEN ANDERSON,
 RUFUS J. BORGHALTHAUS.